(12) United States Patent
Patron et al.

(10) Patent No.: US 11,438,455 B2
(45) Date of Patent: Sep. 6, 2022

(54) METHOD AND SYSTEM FOR PROVIDING CAPTIONED TELEPHONE SERVICES

(71) Applicants: Alberto Patron, San Isidro (AR); Seymour James van den Bergh, Chattanooga, TN (US); Beryl Bucher, Chattanooga, TN (US)

(72) Inventors: Alberto Patron, San Isidro (AR); Seymour James van den Bergh, Chattanooga, TN (US); Beryl Bucher, Chattanooga, TN (US)

( * ) Notice: Subject to any disclaimer, the term of this patent is extended or adjusted under 35 U.S.C. 154(b) by 127 days.

(21) Appl. No.: 15/930,612

(22) Filed: May 13, 2020

(65) Prior Publication Data
US 2020/0366789 A1 Nov. 19, 2020

Related U.S. Application Data

(60) Provisional application No. 62/854,774, filed on May 30, 2019, provisional application No. 62/851,918, filed on May 23, 2019, provisional application No. 62/849,425, filed on May 17, 2019.

(51) Int. Cl.
| | |
|---|---|
| *H04M 3/42* | (2006.01) |
| *G10L 15/26* | (2006.01) |
| *H04M 3/533* | (2006.01) |

(52) U.S. Cl.
CPC ......... *H04M 3/42382* (2013.01); *G10L 15/26* (2013.01); *H04M 3/53333* (2013.01)

(58) Field of Classification Search
CPC ......... H04M 3/42382; H04M 3/53333; H04M 3/436; H04M 3/42391; H04M 2201/40; G10L 15/26
See application file for complete search history.

(56) References Cited

U.S. PATENT DOCUMENTS

| | | | | | |
|---|---|---|---|---|---|
| 6,266,615 | B1 * | 7/2001 | Jin | ......................... | G08G 1/005 701/488 |
| 6,332,122 | B1 * | 12/2001 | Ortega | .................... | G10L 15/26 704/270 |
| 7,822,050 | B2 * | 10/2010 | DeGrazia | .......... | H04M 3/42391 704/207 |
| 8,306,819 | B2 * | 11/2012 | Liu | ....................... | G10L 15/065 704/251 |
| 8,526,581 | B2 * | 9/2013 | Charugundla | ...... | H04L 65/4015 379/142.05 |
| 8,593,501 | B1 * | 11/2013 | Kjeldaas | ............. | H04L 12/1818 704/235 |
| 9,280,969 | B2 * | 3/2016 | Li | ......................... | G10L 15/063 |
| 9,436,357 | B2 * | 9/2016 | Pallakoff | .............. | G06F 3/0483 |
| 10,389,876 | B2 * | 8/2019 | Engelke | .................. | H04W 4/12 |
| 10,573,312 | B1 * | 2/2020 | Thomson | ................ | G10L 15/22 |

(Continued)

*Primary Examiner* — Lisa Hashem

(74) *Attorney, Agent, or Firm* — Miller & Martin PLLC; Stephen J. Stark

(57) ABSTRACT

Internet Protocol captioned telephone service often utilizing Automated Speech Recognition has the capability of transcribing both sides of a conversation. Text bubbles can grow as the speech continues until a break. Synchronization among various user devices can occur during or after calls amongst devices including with the far end caller for some embodiments. A user can allow a call to go to voicemail and see the text and decide whether or not to pick up with transcription continuing for some embodiments.

14 Claims, 4 Drawing Sheets

(56) References Cited

U.S. PATENT DOCUMENTS

| | | | |
|---|---|---|---|
| 2006/0020962 A1* | 1/2006 | Stark | H04N 21/4131 |
| | | | 725/135 |
| 2008/0215971 A1* | 9/2008 | Gillo | A63F 13/31 |
| | | | 715/706 |
| 2010/0100376 A1* | 4/2010 | Harrington | G10L 15/26 |
| | | | 704/235 |
| 2010/0323728 A1* | 12/2010 | Gould | H04M 7/0048 |
| | | | 455/466 |
| 2016/0360034 A1* | 12/2016 | Engelke | H04L 67/02 |
| 2017/0085506 A1* | 3/2017 | Gordon | H04L 51/066 |
| 2017/0201613 A1* | 7/2017 | Engelke | G10L 15/26 |
| 2018/0034961 A1* | 2/2018 | Engelke | H04W 4/06 |
| 2020/0007671 A1* | 1/2020 | Engelke | H04M 1/2475 |
| 2020/0243094 A1* | 7/2020 | Thomson | G10L 15/26 |
| 2020/0366789 A1* | 11/2020 | Patron | H04M 3/53333 |
| 2022/0115020 A1* | 4/2022 | Bradley | G06F 40/134 |

* cited by examiner

METHOD AND SYSTEM FOR PROVIDING CAPTIONED TELEPHONE SERVICES

CLAIM OF PRIORITY

This application claims the benefit of U.S. Provisional Patent Application Nos. 62/849,425 filed May 17, 2019, 62/851,918 filed May 23, 2019, and 62/854,774 filed May 30, 2019, all of which are incorporated herein by reference in their entirety.

FIELD OF THE INVENTION

The present invention relates to IP CTS (Internet Protocol Captioned Telephone Service) using (ASR) Automated Speech Recognition, and more particularly to a system configured to provide at least one of (a) read both sides (both near end and far end caller) of a telephonic conversation in text, (b) a way for a hearing impaired user to send a link to the other party so that the near end and far end caller can simultaneously view the captioned text, (c) an ability for a single IP CTS user to use any telephonic device to make or receive captioned telephone calls (note that the caption portion of the conversation can only be viewed on an internet connected device), (d) an ability of a single IP CTS user to view captions of the telephone conversation on at least one of multiple internet connected devices, possibly simultaneously, (e) an ability to simultaneously transmit both sides of the communication at the same time in text or captioned form, and/or (h) having an ability to synchronize historical captioned text between the devices independently of text storage at the IP CTS. Thanks to the use of VoIP technology (SIP and RTP), it's possible to analyze separate audio streams (user's and remote party's audio streams). This approach improves voice recognition significantly possibly to provide (i) an ability to display the captions of a one-sided or two-sided IP CTS captioned conversation in speech bubbles, where it is made clear graphically which speaker is talking and may display their avatar or their initials to this end, (j) an ability to graphically distinguish captions that are "in progress" as opposed to those that have been finalized, and/or (k) the use of WebSocket technology to push information and receive information from devices showing the captioning in one device (in one or in more than one device simultaneously), or at least one or more of features (a)-(k) for various embodiments.

BACKGROUND OF THE INVENTION

Ever since the telephone was invented individuals with hearing loss have struggled to communicate on it. Hearing the person on the other end of the call is a major problem for a hard of hearing user and the traditional PSTN (Public Switch Telephone Network) has never been configured to accommodate this need. Historically, the use of a relay service has been the solution. A relay service traditionally involves a third-party operator that helps facilitate communication between the two parties on a call. The first relay service used a TTY (Teletypewriter) that allowed the hearing-impaired user to read what the other party was saying. It would work by having the far end caller speak, then the operator would listen to what was being said and then type it word for word, in essence "relaying the message". The individual with hearing loss would then read conversation that the relay operator sent.

As technology changed so did relay services. The latest iteration of the relay service is IP CTS (Internet Protocol Caption Telephone Service). IP CTS functions much in the same way as the traditional relay service except it relies on technology such as the internet and computers to speed up the transmission of the captions to the end user. IP CTS currently operates in one of two ways. First, by using a CA (Captioning Assistant) who listens to the conversation and then re-voices it to a computer. The computer then uses voice recognition software to turn the CA's speech into text which is then sent to the end user to read. A competing method of IP CTS uses highly trained transcriptionists that listen to the conversation and then retype every word which is ultimately sent to the user. In both cases the human CAs or Transcriptionists are an integral part of the conversation and service. Thanks to continued advances in technology computers are finally surpassing humans in accuracy and efficiency. ASR (Automated Speech Recognition) is the next major leap forward in IP CTS. Some IP CTS providers are beginning to experiment with a new "hybrid" approach where their call centers give the CA the ability to switch between ASR and the CA computer re-voicing to provide a better experience for the hearing-impaired user. A current U.S. Pat. No. 10,044,854, incorporated herein by reference, is one such improvement.

The applicant appreciates that improvements have been made, such as using ASR together with a human translator, but still further improvements are believed to be desirable to provide improved services for at least hearing-impaired users.

One feature of IP CTS is that conversational captioned text is not stored on a server controlled by the IP CTS. Such storage is currently expressly forbidden by the Federal Communication Commission. Once the text is sent, it cannot be recalled by the IP CTS. However, what if a user employs multiple devices, and would like to recall text on more than the device connected to the IP CTS when the call was captioned? In current systems, the text delivered to a specific device during a particular call would be available on that one device, and no others.

The applicant appreciates that improvements have been made, but still further improvements are believed to be desirable to provide improved services for at least hearing-impaired users.

SUMMARY OF THE INVENTION

It is an object of many embodiments of the present invention to provide improved IP CTS services to a user.

It is another object of many embodiments to provide improvements to the field of captioned telephone services.

It is another object of many embodiments of the present invention to provide improved communication though captioned telephone services, such as providing both sides of communication in text (i.e., what the far end caller (aka, a remote party or non-CaptionMate user or first caller) says as well as what the IP CTS user says).

It is another object of many embodiments of the present invention to provide improved communication though captioned telephone services, such as providing a way for a user, such as a hearing-impaired user to send a link to the other party so that the near end and far end caller can simultaneously view the captioned text. This allows the far end caller (aka, a remote party or non-CaptionMate user or first caller) to confirm that what he/she is saying is being captioned correctly ensuring accuracy and understand of the conversation.

It is another object of many embodiments of the present invention to provide improved communication though captioned telephone services, an ability for a single IP CTS user to use any telephonic device to make or receive captioned telephone calls (note that the caption portion of the conversation can only be viewed on an internet connected device). For example, the user might have multiple calling devices such as a work landline, a residential landline, a flip phone and/or smartphone and, using a single user profile and application phone number, initiate and receive captioned phone calls on their device of choice.

It is another object of many embodiments of the present invention to provide improved communication though captioned telephone services, the ability of a single IP CTS user to view captions of the telephone conversation on multiple internet connected devices simultaneously. For example, the user could initiate the call on a smartphone while simultaneously viewing the captions on their tablet and/or computer.

It is another object of many embodiments of the present invention to provide improved communication though captioned telephone services such as providing an ability to transmit both sides of the communication at the same time. Thanks to the use of VoIP technology (SIP and RTP), it's possible to analyze separate audio streams (user's and remote party's audio streams). This approach improves voice recognition significantly.

It is another object of many embodiments of the present invention to provide improved communication though captioned telephone services, the ability to display the captions of a one-sided or two-sided IP CTS captioned conversation in speech bubbles, where it is made clear graphically which speaker is talking and may display their avatar or their initials alongside the captions to this end.

It is another object of many embodiments of the present invention to provide improved communication though captioned telephone services, the ability to graphically distinguish captions that are "in progress" as opposed to those that have been finalized. For example, this distinguish might be made clear to the user by using a different color of captioning bubble to allow the user to clearly see which captions are considered "final" and which are considered to still be "in progress".

It is another object of many embodiments of the present invention to provide improved communication though captioned telephone services, the use of WebSocket technology to push information and receive information from devices showing the captioning in one device (in one or in more than one device simultaneously).

It is another object of many embodiments of the present invention to provide improved communication services though captioned telephone services, such as synchronized transcribed text sent from one of multiple devices to another under the control of a user.

Accordingly, in accordance with many embodiments of the present invention, a captioned telephone service is provided. A far end caller (aka, a remote party or non-CaptionMate user or first caller) and a user initiate a call through the service. Specifically, the user routes a call from a telephone number controlled by the system, or the far end caller could call the telephone number controlled by the system. Alternatively, the user (aka, a subscriber to the IP CTS system), may call the far end caller.

With the call initiated, in which at least the user preferably has an IP CTS telephone number, at least some embodiments of the service preferably applies ASR to the call, which has made significant progress in technology to be very reliable. Without human interpretation, the ASR software can transfer to text not only the far end caller's spoken words as has been done (at least partially), in the prior art, but also the user's speech. This way, if a user desires to review the conversation at a later date, the user can not only see what the far end caller spoke (as can be done with prior art systems), but also what the user said (which is not presently provided with any IP CTS system currently available in the marketplace). Other embodiments may utilize human directed captioning, but such embodiments are likely to be rare due to the costs and relative slowness of the process as compared to modern ASR software which can provide almost instantaneous captioning of spoken words in roughly 100 languages.

The hearing-impaired user may view and read both sides of the conversation (what they say as well as what the other party or parties say) during a live call, all in real time, as well as possibly retain a secure and/or private transcript that the user may have available to them after the call has ended. Currently no other IP CTS provider allows for both sides of a conversation to be viewed or even read after a call making it incredibly difficult for the user to fully understand the conversation as, at best, they would only be provided one side of the conversation (what the other party says). Embodiments of this invention may also allow the user the choice as to whether they would like to view one side of the conversation or both or even toggle between the two options during a live call.

Now a complete conversation can be provided in text so that the far end caller's text can be evaluated in the context of both sides of the conversation. This can be done with separate and identifiable speech bubbles, or otherwise. Conference calls could be captioned as well with each party's voice having its own text possibly its own text bubble color and/or location on the display screen, or distinguished by avatars or other images or text. Furthermore, instead of having one sender send a message by text to then be commented or responded to by another by text as is done with text messaging, the messaging service may be provided side-by side as they occur in an "open-line", potentially continually, simultaneously, or even in an overlapping manner utilizing web sockets, or otherwise, like a traditional verbal conversation could occur. Additionally, as a user or far end caller speaks, the "active" text bubble grows, indicating that the speech has not been finalized and is still improving and increasing, and can even scroll down a screen for at least some embodiments in almost real time. This can occur side by side (or simultaneously) if both parties are speaking at the same time. Text bubbles are not believed to be in the prior art with IP CTS systems as have been used in SMS texting where when the user presses send, a fixed size text bubble is then sent (i.e., it cannot grow once sent). Instead, the software keeps adding text until it detects a break in conversation or the speech has been finalized, and then begins a new text bubble when speech resumes (by either, or both, parties). This capability may be available in both an active call and in historical transcripts stored on the device, although in the historical transcripts there are no "active" bubbles.

Additionally, the user may choose, during an active call or while viewing a historical transcription, to decide whether to view just the remote party's conversation or both sides of the conversation, and may easily change between the two options, something that the marketplace has not seen to date for IP CTS.

Additionally, since the user is the party receiving IP CTS text, in at least some embodiments of the present invention, the user may have an ability to send a link to the far end caller so that when activated, the far end caller then can view the text conversation in a similar manner as the user, such as in a simulcast type manner. This may be helpful in various scenarios, such as: "I think I understood your directions to the business meeting location, please confirm that this text description is accurate." Of course, there may be many other scenarios where the far end caller may benefit from seeing the conversation in text as well. The ability, while on a live call, for the hearing-impaired user to send a link to the other party (far end caller) so that they can view, read, and follow along the conversation at the exact same time allowing both parties the ability to view the conversation during a call (at the discretion of the hearing-impaired user) is believed to be novel. This (simul)taneous-broad(cast) or simulcast may provide better understanding and accuracy for each party on the call.

Additionally, for at least some embodiments, a user has a telephone number (possibly newly assigned with the service) that is directed through the applicant's service. That number can be associated with a landline, a cell phone, such as a smart phone, or accessed via a website and/or application (app) on a device such as on a smart phone, tablet or other computer. A single number could be utilized by a user on multiple devices, something that the marketplace has not seen to date for IP CTS.

Additionally, for at least some embodiments, the captions are pushed to the captioning devices by use of WebSocket technology. In addition, options that the user may change during a call (including changing the captioning language, whether to view one or more sides of the conversation, DTMF (Dual-tone Multi-Frequency signaling), sharing a link with the remote user) are pushed to the user's devicess, which the applicant believes has not been done for IP CTS users in the past. This functionality allows the user to interact with IVR (Interactive Voice Response) systems. This means that IVR menus are transcribed and the user can select menu options using telephone's dial pad.

The applicant has taken a totally new and unique approach to providing IP CTS by using ASR coupled with AI (Artificial Intelligence) for at least some embodiments to be the first to potentially take human CAs and/or Transcriptionists totally out of the equation and allowing computers to provide captions to individual's with hearing loss over a phone call.

With some embodiments the call is initiated, and the user, if not previously connected to the IP CTS system through multiple devices, may connect additional devices to the IP CTS system. At least the user preferably has an IP CTS telephone number, and the service preferably applies ASR to the call, which has made significant progress in technology to be very reliable. The far end caller's text, and possibly the user's text can be transcribed in almost real time. Furthermore, all of the connected devices of the user to the IP CTS system can view the conversation as it occurs if they are connected to the IP CTS service during the entire call. The ASR software, if utilized, can transfer to text not only the far end caller's spoken words, but also the user's speech, while potentially separating the two caller's speech.

Additionally, since the transcribed text is not stored by the captioned telephone service, the text is stored only on the user's devices that are open during the call at the end of the call. However, later, the user may open more devices. Either at the user prompting or automatically, the multiple devices can synchronize transcribed text amongst themselves (and preferably not through the captioned telephone service) so that each of the devices has the same information as was delivered to any other device when the devices are connected to the IP CTS system.

BRIEF DESCRIPTION OF THE DRAWINGS

The accompanying drawings illustrate preferred embodiments of the invention and, together with the description, serve to explain the invention. The drawings may not show elements to scale. These drawings are offered by way of illustration and not by way of limitation.

DETAILED DESCRIPTION OF THE PREFERRED EMBODIMENTS

Figure 1:
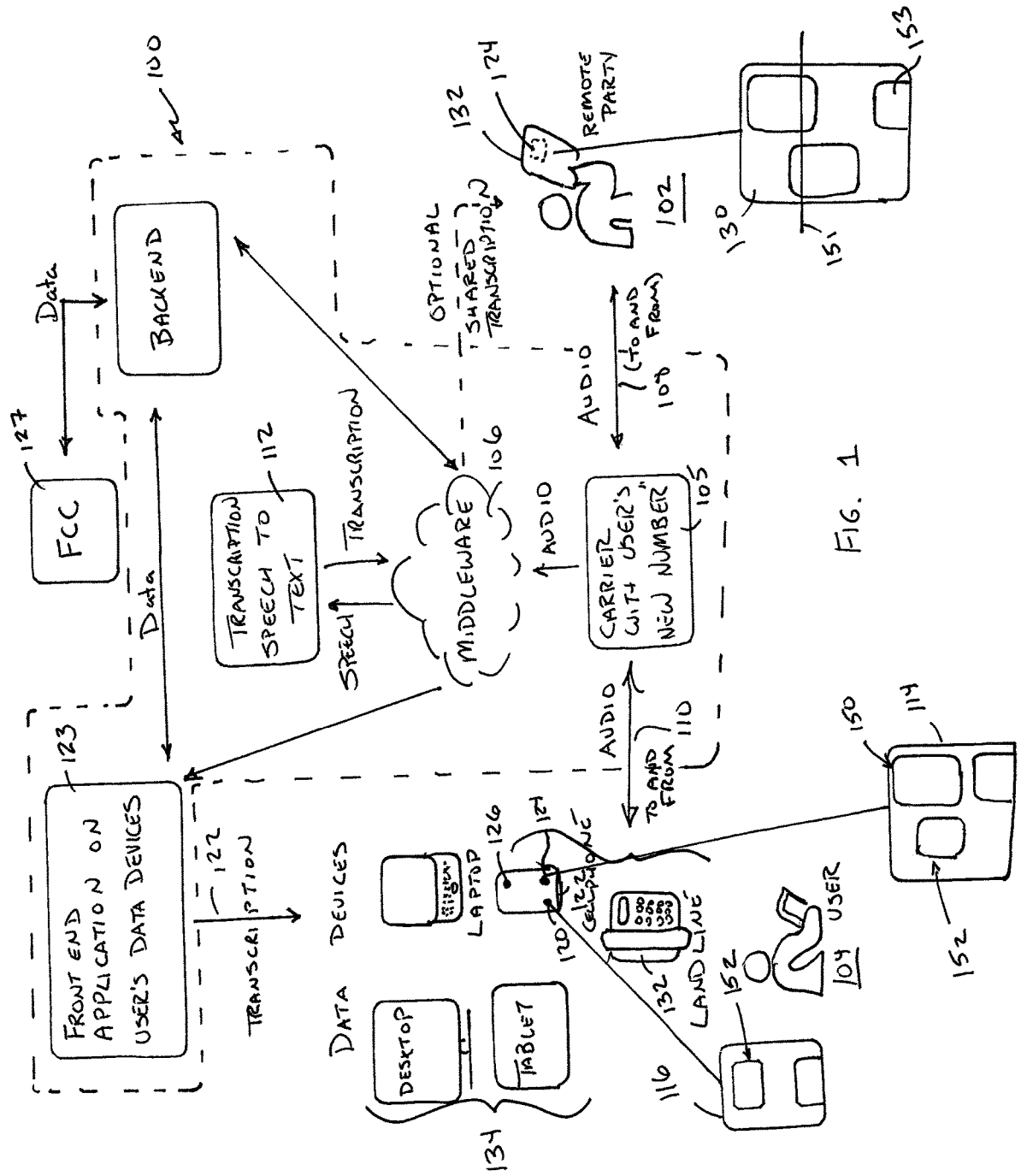
FIG. 1 is a diagram of an exemplary captioned telephone service (CTS) system 100 suited for implementing embodiments of the present invention.
Figure 2:
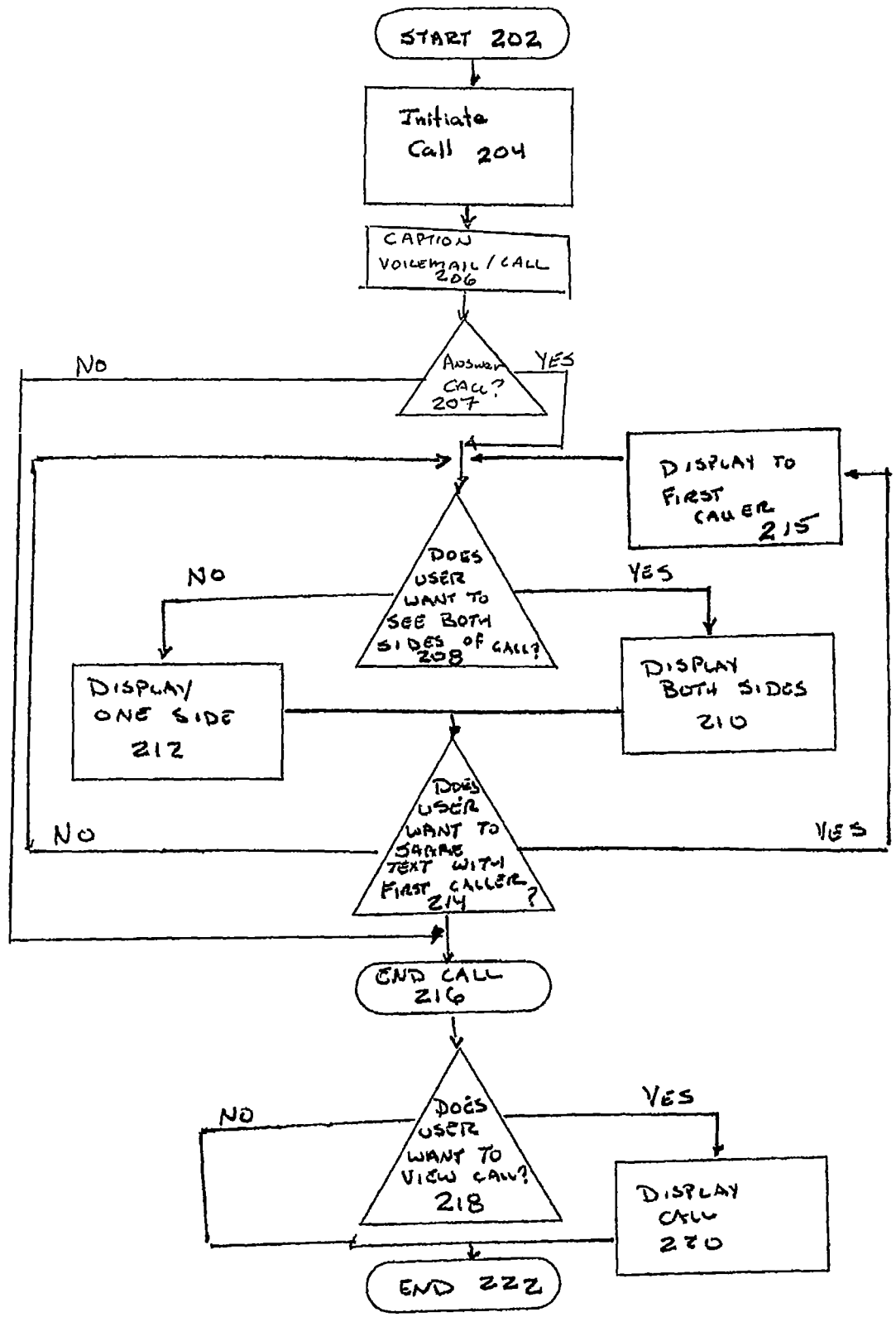
FIG. 2 is a flowchart of an exemplary method 200 for providing captioned telephone service (CTS) in accordance with one or more embodiments of the present invention.

FIG. 1 is a diagram of an exemplary captioned telephone service (CTS) system 100 such as an internet protocol captioned telephone service (ICPTS) suitable for implementing embodiments of the present invention. A far end caller 102 can communicate with the user 104 (or vice versa) through the system 100 whereby at least the user 104 receives captioned texts on a screen or display 114 or 116 related to the conversation as will be explained in further detail below. A telephone call is started in flowchart 200 such as at start 202 by initiating a captioned telephone service call 204 (by either far end caller 102 or user 104).

The user 104 preferably has a phone number which is registered with the system 100 such as at a captioned telephone service manager 105 as would be understood by those of ordinary skill in the art. This could be a block of telephone numbers purchased from a various carrier or otherwise acquired as is well known through a cellular provider, voice over the internet protocol and/or other internet based telephone services such as MagicJack and/or other telephone number provider. Even business telephone services such as Grasshopper and others are migrating to voice over the internet numbers. In some embodiments, the phone number of the user 104 could even be migrated into the captioned telephone service manager 105 as would be understood by those of ordinary skill in the art.

With the call initiated at step 204, the captioned telephone service manager 105 can direct the spoken communication illustrated as from the far end caller as line 108 and from the user as line 110 to a captioner 112, possibly through middleware 106, as preferably an automated speech recognition (ASR) captioner 112. This is shown being performed at step 206. While other embodiments could utilize human captioners, humans are not utilized in many presently preferred embodiments of the applicant's technology Eliminating humans completely can be performed with ASR transcription. Speech recognition software has been found to be particularly accurate and cannot only interpret English and Spanish but also over one hundred different languages can be captioned as of the writing of this application with at least ASR program. As those services continue to expand even more languages are more likely to be included.

In the prior art, only the far end caller's 102 speech 108 would be converted to text and normally done by a human. By converting not only the far end caller's 102 speech 108 to text 122 but also the speech 110 of the user 104, an ability to provide a complete conversation is provided which has not been done in the prior art in the past. Not only does this help the user 102 during the call as will be explained in further detail below, but also after the call ends the entire conversation can be displayed at least back to the user 102 for future use which is not capable of being provided in any prior art system that the applicant is aware. Furthermore, in the prior art, the text would be a stream of consciousness, not likely to be interrupted with where other parties might be speaking.

Unlike SMS text communications where text bubbles can only be provided sequentially, the applicant is able to utilize web sockets so that the messaging may be provided side by side as sides 150,152 as they occur potentially continuously or simultaneously or even an overlapping manner such as at the same time 151 with text filling the illustrated bubbles on screen 130 as the traditional conversation could occur in an open line manner. Accordingly, interruptions appear as interruptions (overlapping text or text bubbles which could be displayed side by side or otherwise) as opposed to what can be a somewhat disjointed conversation through text messages when one party attempts to talk over the other party but messages send only when "send" is pressed. Additionally, speech bubbles 153, etc. may grow as a particular individual, i.e., user 104 or first caller 102, etc., speaks until a break is detected by middleware 106 or other portion of the system 100, or until the automated speech recognition (ASR) captioner 112 finalizes a portion of the speech. This does not and cannot happen with SMS technology.

The user has the ability at step 208 to select whether or not the user desires to see both sides 150,152 of the conversation as can be displayed at step 210 or only the far end caller's side 152 of the conversation which could be displayed at step 212 as could occur at either display 114 or 116 depending on which is selected such as by pushing or otherwise selecting a display 114,116 such as by pushing display buttons 118,120 respectively on the user's phone 122. This could occur using front end software module 123 or otherwise.

At the election of the user 104, the far end caller 102 may also receive a simulcast illustrated by text screen 124 which may be identical to the text stream 122 provided to the user 104 such as at display 114 or 116 depending on whether or not both sides 150,152 of the conversation display or not and provided as text stream 124. Specifically, a link 128 may be sent such as by pressing activation button 126 at step 214 which can send a text message or other link 128 so that, when activated, the text screen 130 may be visible to the first user such as at smartphone 132 and/or other appropriate device at step 215.

Unlike prior art systems, the user 104 now has an ability to share the display 130 with the far end caller 102 which may not be a subscriber to the system 100 at all. User 104 may be able to disable display 130 in some embodiments as well. Additionally, the display 130 can be a simulcast of the display 114 (or 116) at the election of the user who can selectively toggle between whether he desires to see the display of both parties spoken words, i.e., the text screens or just the text of the far end caller's conversation 108 at 116. Eventually the call will end at step 216. Although only a far end caller 102 is shown in the figures having text 150 in the conversation, conference calls could potentially provide similar text (except potentially separated by multiple other callers) in bubbles identifiable by caller(s) for at least some embodiments.

Unlike prior art conversations, to the extent any ability to retrieve text is provided if such ability exists, the user 104 would, at best, only be able to recall the far end caller's 102 text 152 as that was all that was captioned during the call. Instead, if the user 104 wants to see the call at step 218, which may or may not require the entry of a telephone number and password, and/or possibly other information or not, the user is then provided an ability to display both sides of the call at step 220 before ending the process at step 222 so that display 114 could be shown or regenerated to show both sides 150,152 of the call which the user 104 desires to see as would be understood by those of ordinary skill in art.

FIG. 1 shows user 104 using smartphone 122 or other cell phone or computer but is also understood that the user 104 could be utilizing a landline 132 for a spoken communication and also be while receiving the captioning 122 via a computer 134 which could be a home computer, laptop, tablet etc. A telephone having a display and/or other system could be utilized with still further embodiments.

Furthermore, the current embodiment is not only provided for iPhones 122, landlines 132 but also with Android operating systems and possibly other operating systems so as to not only be available for use by users with iPhones as Smartphones 122, but also Android operating phones and/or other phones, computers such as iPads Android software operating tablets, computers capable of voice over internet protocol and/or other devices so that not only may apps be run on phones 122 but also on computer style devices both currently in the marketplace and may be developed in the future. Additionally, a single user 104 might use any of a variety of devices such as smartphone 122, landline 132 or others at their disposal which the telephone captioning service manager 105 could certainly identify as being associated with the user 104 and a specific telephone number.

A backend system 125 can be utilized to store communication data and/or provide other functionality. The backend system 125 may be able to communicate with the front end system 123. The backend system 125 may also be able to communicate with the Federal Communication Commission (FCC) 127 so as to provide appropriate data to the FCC, if so desired.

Figure 5:
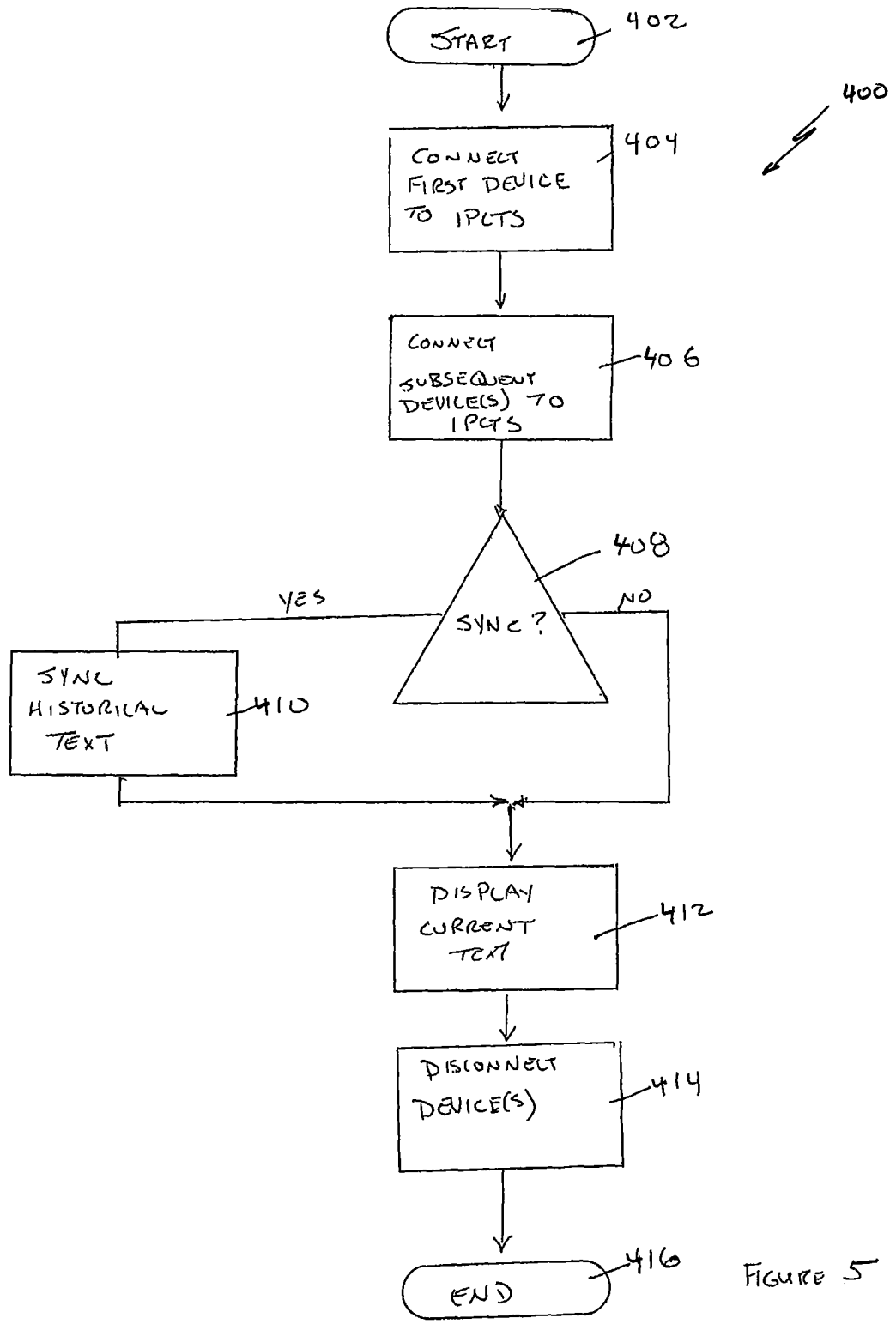
FIG. 5 is a flowchart of an exemplary method for providing captioned telephone service (CTS) text amongst multiple devices in accordance with one or more embodiments of the present invention.

FIG. 5 is a flowchart 400 of a method of synchronizing multiple devices which may be used by a user 302 (from FIG. 3) with a captioned telephone service (CTS) system such as an internet protocol captioned telephone service (ICPTS) suitable for implementing embodiments of the present invention. However, typically the IP CTS provider cannot, under current FCC rules, store the conversations for later retrieval by the user 302. The method can start at step 402.

When a single, or first device 304, was the only device being used by the user 302 to communicate with the IP CTS provider, this did not generate problems as the first device 304 had every conversation stored on that first device 304. However, with the advent of newer technology, a user 302 can access the IP CTS through computers, tablets, smartphones or possibly other devices, such as through an app, websites, etc., illustrated as first device 204, second device 306, third device 308, etc. Since the IP CTS cannot have a server to update each of the different devices 304,306,308, etc., with all of the text distributed during any given conversation that has occurred in the past, including possibly a current one before the subsequent device 306,308,etc.

engages the IP CTS system, a need exists for an improvement to share information amongst the IP CTS devices 304,306,308, etc.

The user 302 preferably has a phone number which is registered with the system such as at a captioned telephone service manager 300 as would be understood by those of ordinary skill in the art. This could be a block of telephone numbers purchased from a various carrier or otherwise acquired as is well known through a cellular provider, voice over the internet protocol and/or other internet based telephone services such as MagicJack and/or other telephone number provider. Even business telephone services such as Grasshopper and others are migrating to voice over the internet numbers. In some embodiments, the phone number of the user 302 could even be migrated into the captioned telephone service manager 300 of the system as would be understood by those of ordinary skill in the art.

With a call initiated at step 404 from a first device 304, the captioned telephone service manager can direct text to the user 302 at the first device 304 as being converted to text from a far end caller 310 with the caller's device 312. However, unless a subsequent, or second device 306 of the user 302 is connected to the captioned telephone service manager 300 during the call, the second, and subsequent devices, 306,308, etc. would normally not receive the historical text already delivered.

The user 302 may certainly have more than one device such as one or more computers, tablets, smartphone, etc. connected to the captioned telephone service manager of the service 300 at once. If multiple devices 304,306,308,etc., are not already connected when the call is initiated at step 404, then additional multiple devices 306,308,etc., may be opened any time during the call at step 406, but without the feature described below, they would only be able to receive the text as it is transcribed, and not text sent before the subsequent devices 306,308,etc., were actively connected to the captioned telephone service manager 300.

Using web sockets, in a preferred embodiment, captions 150,152 from either the user 302 or the far end caller 310 can be synched from one device to another. For at least some embodiments, the transcribed conversations can be synched amongst any of the devices (304,306,308,etc.) that are connected to the captioned telephone service manager 300 for the user 202 using the phone number of the user 302.

Specifically, when a second device 306 connects to the captioned telephone service manager 300, the historical text may either be automatically synched from the first device 304 to the second device 306, or it may be that the user 302 is given the opportunity to sync to the second (or subsequent) device 306 from any of the text on the first device 304 (or from the second device 306 back to the first device 304) with both sharing the ability to communicate with the captioned telephone service manager 300 such as at step 408, by pressing sync button 314 or otherwise.

In fact, it may be that if a user 302 logs onto the captioned telephone service manager 300 with the second device 306, the app loaded on the second device 306 of the user can recognize through information at the captioned telephone service manager 300 that there is another device (the first device 304 or another device such as 308) which is active with the captioned telephone service manager 300 for this telephone number to then send an inquiry for either the first and/or the second device, etc. 304,306, etc. to request to synchronize directly with the other device(s) (independently of text being stored at the captioned telephone service manager) for text (such as 150,152) previously sent by the captioned telephone service manager to one or the other of the devices. If so elected at step 408, synchronization can occur at step 410. Either way, with both devices 304,306 open, they will receive text from far end caller 310 as it occurs in real time, it is just that without synchronization, historical text does not appear on the newly opened device, such as second device 306, etc. at step 412.

For still other embodiments, either automatedly, or by user request, the devices 304,306,308, etc. can communicate with each other to synchronize one or more conversation text history across all open devices 304,306,308, etc. such as at steps 410 and 412. Accordingly, if two or more devices 304,306,308, etc. are open (i.e., connected to the captioned telephone service manager 300, such as through an app or otherwise), either automatically or by user request, the multiple devices 304,306,308, etc., can "talk", i.e., communicate, to each other through web socket connections, or otherwise, and exchange information so as to "sync" the transcriptions that exist on the devices, 304,306,308, etc., thereby allowing the transcriptions that exist on one device 304,306,308, etc. to be sent to the other device, 304,306,308, etc. and vice versa and both can continue to provide connection to a current call such as to far end caller 310, if in process.

Of course, it is possibly for the process of FIG. 5 to occur without a current call to a far end caller 310 being in place for many embodiments. It may be that if two or more devices 304,306,308, etc. connect to the captioned telephone service manager 300 with the same telephone number, that they can then sync as described herein for historical conversation such as 150,152, etc. Once the call is over, or as devices 304,306,308,etc. disconnect from the captioned telephone service manager 300, such as at step 414, then the process can end at step 416.

Figure 3:
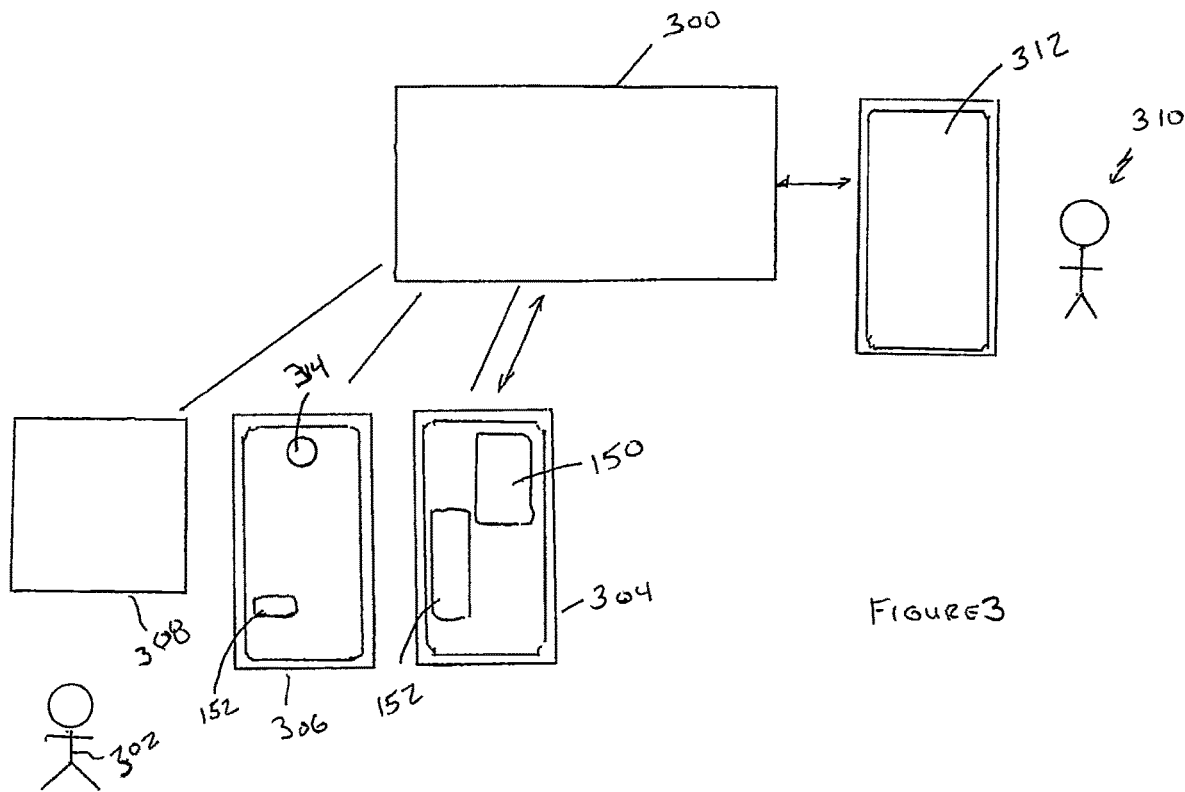
FIG. 3 is a schematic view showing multiple devices connecting using a common number to an IP CTS system.
Figure 4:
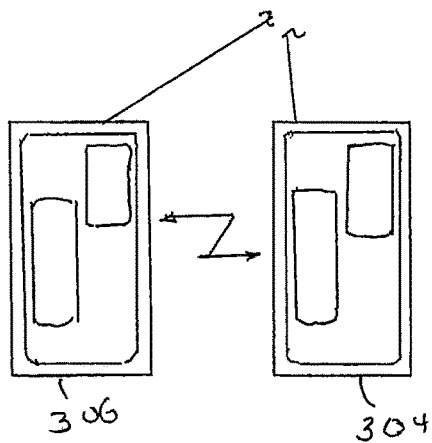
FIG. 4 is a schematic view showing the multiple devices synching text amongst themselves.

FIG. 3 shows user 302 using smartphone 304 or other cell phone, tablet, phone or computer but is also understood that the user 302 could be utilizing a landline for a spoken communication while also receiving the captioning via a computer which could be a home computer, laptop, tablet etc. A telephone having a display and/or other system could be utilized with still further embodiments.

Furthermore, the current embodiment is not only provided for iPhones, landlines but also with Android operating systems and possibly other operating systems so as to not only be available for use by users with iPhones as Smartphones, but also Android operating phones and/or other phones, computers such as iPads Android software operating tablets, computers capable of voice over internet protocol and/or other devices so that not only may apps be run on phones but also on computer style devices both currently in the marketplace and may be developed in the future. Additionally, a single user 302 might use any of a variety of devices such as smartphone, landline or others at their disposal which the telephone captioning service manager 300 could certainly identify as being associated with the user 302 and a specific telephone number.

As one of ordinary skill in the art can quickly see, there are a host of new features which advance the technology associated with captioned telephone service currently available in the marketplace.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed herein is:

1. A method of transcribing audio to text through a captioned telephone service manager comprising the steps of:
   connecting a call between a far end caller and a user through a telephone number managed by a captioned telephone service manager;
   said captioned telephone service manager utilizing a captioner to transcribe audio to text of the far end caller and sending the text to a device of the user in approximately real time; and sending at least the far end caller's text to a device of the user; wherein the text of the far end caller appears in a bubble that grows until the far end caller takes a break from talking, and
   the captioner transcribes audio to text of the user separating text of the far end caller from the text of the user and sending both to the user in spaced apart, separated text bubbles.

2. The method of claim 1 wherein the connection of the call is at least initially to voicemail of the user.

3. The method of claim 2 wherein the user accepts the call and communicates with the far end caller, while the captioner continues to provide text of the far end caller to the device of the user.

4. The method of claim 1 wherein the user initiates the call to the far end caller.

5. The method of claim 1 wherein the captioner utilizes automated speech recognition software.

6. The method of claim 1 wherein the user can retrieve text from both the user and the far end caller after termination of the call at the device.

7. The method of claim 1 wherein the device is a separate computing device from a phone receiving the audio of the far end caller.

8. The method of claim 7 wherein the user selects whether or not to view the text of the user during the call; and if the user elects to view the text of the user, the text of the user appears on the device during the call, but if the user elects not to view the text of the user, the text of the user does not appear on the device during the call.

9. The method of claim 1 wherein the device receives both the text which is displayed on the device as well as the audio of the far end caller.

10. The method of claim 1 wherein the device is one of multiple devices known by the captioned telephone service manager associated with the telephone number, and the text is sent to the multiple devices simultaneously by the captioned telephone service manager.

11. The method of claim 1 wherein the device is one of multiple devices known by the captioned telephone service manager associated with the telephone number, and, after the call, the text of the call is synched from the device to at least one other of the multiple devices.

12. The method of claim 11 wherein data is sent from the device through web sockets to at least one other of the multiple devices.

13. A method of transcribing audio to text through a captioned telephone service manager comprising the steps of:
    connecting a call between a far end caller and a user through a telephone number managed by a captioned telephone service manager;
    said captioned telephone service manager utilizing a captioner to transcribe audio to text of the far end caller and sending the text to a device of the user in approximately real time; and sending at least the far end caller's text to a device of the user; wherein the text of the far end caller appears in a bubble that grows until the far end caller takes a break from talking; and
    wherein the user selects whether to view the text of the user, while viewing the text of the far end caller, and the captioner transcribes audio to text of the user and separates text of the far end caller from the text of the user and sends both to the user.

14. The method of claim 13 wherein if the text of the user is viewed by the user, the text of the far end caller and the user is segregated at the device for viewing by the user.

* * * * *